(12) United States Patent
Books et al.

(10) Patent No.: US 11,597,386 B2
(45) Date of Patent: Mar. 7, 2023

(54) SYSTEM AND METHOD FOR REGENERATIVE BRAKING TORQUE SCHEDULING

(71) Applicant: Cummins Inc., Columbus, IN (US)

(72) Inventors: Martin T. Books, Columbus, IN (US); Joseph E. Paquette, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 15/734,134

(22) PCT Filed: Jul. 31, 2019

(86) PCT No.: PCT/US2019/044332
§ 371 (c)(1),
(2) Date: Dec. 1, 2020

(87) PCT Pub. No.: WO2020/028487
PCT Pub. Date: Feb. 6, 2020

(65) Prior Publication Data
US 2021/0213950 A1   Jul. 15, 2021

Related U.S. Application Data

(60) Provisional application No. 62/713,142, filed on Aug. 1, 2018.

(51) Int. Cl.
*B60W 30/18* (2012.01)
*B60W 10/08* (2006.01)
(Continued)

(52) U.S. Cl.
CPC ......... *B60W 30/18127* (2013.01); *B60L 7/18* (2013.01); *B60T 1/062* (2013.01);
(Continued)

(58) Field of Classification Search
CPC .......... B60W 30/18127; B60W 10/08; B60W 10/196; B60W 2510/081; B60W 2540/10;
(Continued)

(56) References Cited

U.S. PATENT DOCUMENTS 7,104,617 B2   9/2006   Brown
7,615,950 B2   11/2009   Ogata
(Continued)

FOREIGN PATENT DOCUMENTS

| CN | 101512477 B | * | 11/2011 | ........... B60K 17/356 |
| CN | 103072576 A | * | 5/2013 | ............ B60W 30/18 |

(Continued)

OTHER PUBLICATIONS

International Search Report and Written Opinion, issued by the ISA/US, Commissioner for Patents, dated Oct. 11, 2019, for International Application No. PCT/US2019/0443332; 8 pages.
(Continued)

*Primary Examiner* — Tisha D Lewis
(74) *Attorney, Agent, or Firm* — Faegre Drinker Biddle & Reath LLP

(57) ABSTRACT

A method is provided for scheduling regenerative braking torque, including: sensing a position of an accelerator pedal; generating a torque request value in response to the sensed accelerator pedal position; determining a speed of operation of a motor/generator; determining a torque limit in response to the torque request value and the determined speed of the motor/generator; generating a regenerative braking command in response to the torque limit; and outputting the regenerative braking command to the motor/generator.

17 Claims, 9 Drawing Sheets

(51) Int. Cl.
*B60L 7/18* (2006.01)
*B60T 1/06* (2006.01)
*B60W 10/196* (2012.01)
*B60L 50/60* (2019.01)
*B60L 50/40* (2019.01)
*B60K 6/20* (2007.10)
*B60L 7/26* (2006.01)

(52) U.S. Cl.
CPC .......... *B60W 10/08* (2013.01); *B60W 10/196* (2013.01); *B60K 6/20* (2013.01); *B60L 7/26* (2013.01); *B60L 50/40* (2019.02); *B60L 50/60* (2019.02); *B60L 2240/421* (2013.01); *B60L 2240/423* (2013.01); *B60L 2250/28* (2013.01); *B60T 2270/604* (2013.01); *B60W 2510/081* (2013.01); *B60W 2540/10* (2013.01); *B60W 2710/083* (2013.01); *B60W 2710/18* (2013.01); *B60Y 2200/92* (2013.01)

(58) Field of Classification Search
CPC ......... B60W 2710/083; B60W 2710/18; B60L 7/18; B60L 50/60; B60L 50/40; B60L 7/26; B60L 2240/421; B60L 2240/423; B60L 2250/28; B60T 1/062; B60T 2270/604; B60K 6/20; B60Y 2200/92
See application file for complete search history.

(56) References Cited

U.S. PATENT DOCUMENTS

| 8,135,526 | B2 | 3/2012 | Minarcin et al. |
| 8,694,190 | B2 | 4/2014 | Sawayama et al. |
| 8,775,004 | B2 | 7/2014 | Suzuki |
| 9,205,748 | B2 | 12/2015 | Hirata |
| 9,296,391 | B2 | 3/2016 | Lu et al. |
| 9,340,199 | B1 | 5/2016 | Nefcy et al. |
| 9,352,744 | B2 | 5/2016 | Zhao et al. |
| 9,393,875 | B2 | 7/2016 | Okano et al. |
| 9,533,581 | B2 | 1/2017 | Huh et al. |
| 2002/0116101 | A1 | 8/2002 | Hashiba et al. |
| 2005/0255966 | A1 | 11/2005 | Tao et al. |
| 2013/0162009 | A1 | 6/2013 | Mitts et al. |
| 2016/0257292 | A1* | 9/2016 | Choi .................... B60W 10/115 |
| 2016/0264003 | A1 | 9/2016 | Yokoyama et al. |
| 2020/0189398 | A1* | 6/2020 | Suzuki ................. B60T 8/1766 |

FOREIGN PATENT DOCUMENTS

| CN | 104477038 A | 4/2015 |
| JP | 5040147 B2 | 10/2012 |
| WO | 2018/011816 A1 | 1/2018 |
| WO | 2022251072 A1 | 12/2022 |

OTHER PUBLICATIONS

Supplementary European Search Report and Written Opinion for European patent application No. 19843991, dated Apr. 26, 2022.

* cited by examiner

SYSTEM AND METHOD FOR REGENERATIVE BRAKING TORQUE SCHEDULING

CROSS-REFERENCE TO RELATED APPLICATIONS

The present application is a national phase filing of International Application No. PCT/US2019/044332, filed Jul. 31, 2019, which depends from and claims priority to U.S. Provisional Application Ser. 62/713,142, titled "SYSTEM AND METHOD FOR REGENERATIVE BRAKING TORQUE SCHEDULING," filed on Aug. 1, 2018, the disclosures of which being expressly incorporated herein by reference.

FIELD OF THE DISCLOSURE

The present disclosure generally relates to drivability of electric vehicles or hybrid vehicles, and more particularly to methods and systems for regenerative braking torque limit scheduling.

BACKGROUND OF THE DISCLOSURE

Environmental concerns and limited natural resources are driving modern internal combustion engines toward improved fuel efficiency. A hybrid power train is one system that can be used to improve the fuel efficiency of an engine. Hybrid power trains include at least two power sources, with at least one of the power sources including energy storage capability that can be utilized during at least certain operating conditions to recover kinetic energy from a moving vehicle.

Hybrid power trains that include a diesel engine permit use of an electric motor to speed up the response time (e.g., during acceleration) of the diesel engine, which are known to be inherently slow. This improves the drivability of the hybrid vehicle. Electric motors, however, have inherently very fast response times, both when providing positive torque for acceleration and negative torque for regenerative braking. If the transient characteristics of the electric motor are not limited, the resulting drivability will be unacceptable. This is particularly true for vehicles with electric drive, direct drive systems with no transmission and no clutch such as pure electric vehicles or series hybrid vehicles where there is no connection between the engine and the wheels. Therefore, further technological developments are desirable in this area.

SUMMARY

In one embodiment, the present disclosure provides a method for scheduling regenerative braking torque, comprising: sensing a position of an accelerator pedal; generating a torque request value in response to the sensed accelerator pedal position; determining a speed of operation of a motor/generator; determining a torque limit in response to the torque request value and the determined speed of operation of the motor/generator; generating a regenerative braking command in response to the torque limit; and outputting the regenerative braking command to the motor/generator. In one aspect of this embodiment, sensing a position of the accelerator pedal includes receiving a signal from an accelerator pedal sensor, the signal indicating whether the accelerator pedal is in an active position or an inactive position. In a variant of this aspect, generating a torque request value in response to the sensed accelerator pedal position includes generating a torque request value in response to receiving a signal from the accelerator pedal sensor indicating that the accelerator pedal is in the inactive position. In another aspect, determining a torque limit includes using an algorithm representing a relationship between the torque limit, the torque request value and the determined speed of the motor/generator. Yet another aspect further comprises converting kinetic energy from regenerative braking into electrical energy and storing the electrical energy in an energy storage device. In another aspect of this embodiment, determining a torque limit includes rate limiting decreases in torque below zero Nm.

In another embodiment, the present disclosure provides a system for scheduling regenerative braking torque, comprising: a pedal sensor configured to output a position signal indicating a position of an accelerator pedal; a torque request device coupled to the pedal sensor and operable to generate a torque request value in response to the position signal; a speed sensor configured to output a speed signal indicating a speed of operation of a motor/generator; a controller coupled to the speed sensor and the torque request device, the controller being configured to determine a torque limit in response to the torque request value and the speed signal, generate a regenerative braking command in response to the torque limit, and output the regenerative braking command to the motor/generator. In one aspect of this embodiment, the position sensor indicates whether the accelerator pedal is in an active position or an inactive position. In another aspect, the controller is further configured to determine the torque limit by using an algorithm representing a relationship between the torque limit, the torque request value and the speed signal. In another aspect, the system further comprises an energy storage device coupled to the motor/generator and configured to store electrical energy converted from kinetic energy during regenerative braking by the motor/generator. In a variant of this aspect, the energy storage device is one of a battery or an ultra-capacitor. In another aspect, the controller is further configured to determine the torque limit by rate limiting decreases in torque below zero Nm. In still another aspect, the system further comprises a drive shaft coupled between a load and the motor/generator and configured to transfer energy to and from the motor/generator. In a variant of this aspect, the regenerative braking command causes the motor/generator to apply a negative torque to the load through the driveshaft. In another aspect of this embodiment, the system further comprises an internal combustion engine coupled to the motor/generator. In a variant of this aspect, the internal combustion engine is a diesel engine. Another aspect further comprises a memory device, the controller including a torque module configured to access a look-up table stored in the memory device to determine the torque limit. In yet another aspect, the controller further includes a braking control module configured to generate the regenerative braking command using the torque limit. In another aspect, the torque limit corresponding to a speed signal indicating zero-throttle is within the range of −700 Nm and −2100 Nm. In still another aspect, the torque request value varies in an analog, proportional fashion between a maximum positive limiting value and a maximum negative limiting value as the position of the accelerator pedal varies between an active position and an inactive position.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the disclosure and such exemplifications are not to be construed as limiting the scope of the disclosure in any manner.

DETAILED DESCRIPTION OF EMBODIMENTS OF THE DISCLOSURE

Figure 1:
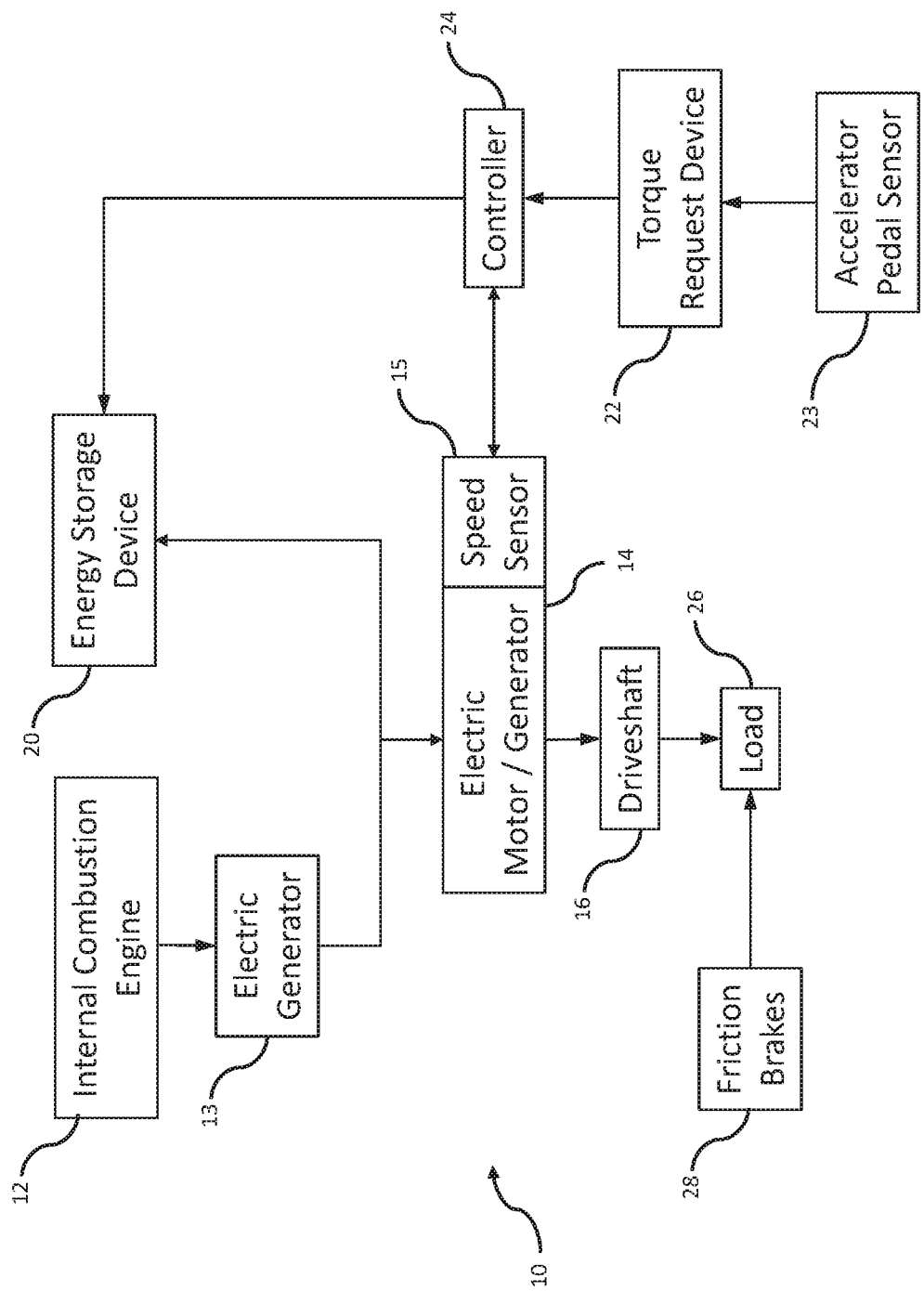
FIG. 1 is a conceptual block diagram of portions of an electric vehicle system according to one embodiment of the present disclosure.

Referring now to FIG. 1, an exemplary system 10 includes a hybrid power train having an internal combustion engine 12 and an electric motor/generator ("MG") 14 selectively coupled to a drive shaft 16. Engine 12 may be any type of internal combustion engine known in the art including a diesel engine or a spark-ignited engine. In the example of FIG. 1, engine 12 is coupled to electric generator 13, the output of which is connected to MG 14. MG 14 is coupled to driveshaft 16. While one example is described herein in detail, it should be understood that other hybrid configurations, including at least series, parallel, and series-parallel, are contemplated herein.

System 10 further includes an energy storage device 20 that stores energy accumulated through operation of electric generator 13 and/or MG 14 in a generator mode. More specifically, electrical energy generated by MG 14 during regenerative braking is stored in energy storage device 20, which may be a battery or group of batteries using any of various battery technologies. The accumulated energy may alternatively or additionally be provided to an ultra-capacitor, provided to service an active electrical load in system 10, or stored or distributed in any other manner.

It should be understood that while MG 14 is depicted as one device, an electric motor and a separate generator may be used. The electric generator is structured to convert vehicle kinetic energy (or load energy) into electrical energy. In various embodiments, system 10 includes any energy accumulation device that converts vehicle kinetic energy (or load energy) available to the alternative power source, such as a hydraulic power recovery unit.

System 10 further includes a torque request device 22 that provides a torque request value. An exemplary torque request device 22 is operatively coupled to an accelerator pedal position sensor 23. However, any device understood in the art to provide a torque request value, or a value that can be correlated to a present torque request for the hybrid power train is contemplated herein. In one embodiment, torque request device 22 provides a first torque request value when accelerator pedal position sensor 23 indicates that the accelerator pedal (not shown) is fully depressed and a second torque request value when accelerator pedal position sensor 23 indicates that the accelerator pedal is not depressed at all. More specifically, when accelerator pedal position sensor 23 indicates that the accelerator pedal is fully depressed, torque request device 22 provides a torque request value representing maximum positive torque, which results in maximum forward acceleration. When accelerator pedal position sensor 23 indicates that the accelerator pedal is not depressed at all, torque request device 22 provides a torque request value representing maximum negative torque, which results in maximum regenerative braking. The torque request value varies in an analog, proportional fashion between the limiting values of maximum positive and negative torque as the position of the accelerator pedal varies. When the accelerator pedal is in a position between the fully depressed and the not depressed at all positions, torque request device 22 provides a torque request value representing zero torque. It should be understood that even maximum regenerative braking is insufficient under certain circumstances, and friction brakes 28 are necessary. For example, friction brakes 28 may be necessary for very aggressive braking and for bring the vehicle to a full stop after the regenerative braking limit reaches zero as described herein.

System 10 further includes a controller 24 having modules structured to functionally execute operations for managing hybrid power train braking. In certain embodiments, controller 24 forms a portion of a processing subsystem including one or more computing devices having memory, processing, and communication hardware. Controller 24 may be a single device or a distributed device, and the functions of controller 24 may be performed by hardware or software or a combination of both.

Figure 2:
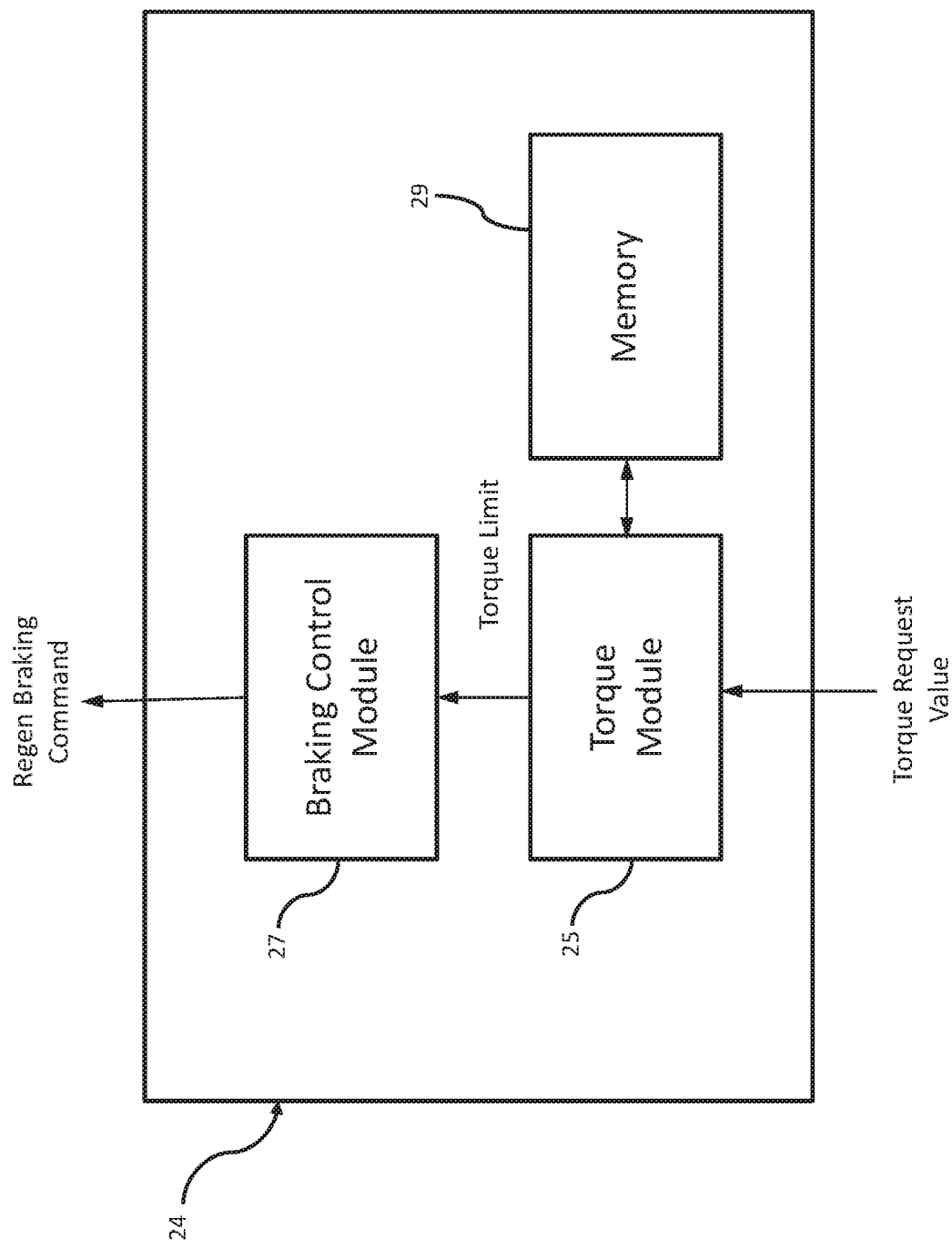
FIG. 2 is a conceptual block diagram of a controller of the system of FIG. 1.

In certain embodiments, controller 24 includes one or more modules structured to functionally execute the operations of controller 24 as depicted in FIG. 2. Controller 24 includes a torque module 25 that interprets the torque request value from torque request device 22, and a braking control module 27 that provides a regenerative braking command. As is further explained herein, torque module 25 of controller 24 interprets the torque request value from torque request device 22 by determining a torque limit corresponding to the torque request value. Braking control module 27 of controller 24 uses the torque limit to generate the regenerative braking command, which is communicated to MG 14.

The description herein including modules emphasizes the structural independence of the aspects of controller 24, and illustrates one grouping of operations and responsibilities of controller 24. Other groupings that execute similar overall operations are understood within the scope of the present disclosure. Modules may be implemented in hardware and/or software on computer readable media, and modules may be distributed across various hardware and/or software components.

Certain operations described herein include interpreting one or more parameters. Interpreting, as utilized herein, includes receiving values by any method known in the art, including at least receiving values from a datalink or network communication, receiving an electronic signal (e.g., a voltage, frequency, current, or PWM signal) indicative of the value, receiving a software parameter indicative of the value, reading the value from a memory location on a computer readable medium, receiving the value as a runtime parameter by any means known in the art, by receiving a value by which the interpreted parameter can be calculated, and/or by referencing a default value that is interpreted to be the parameter value.

Referring back to FIG. 1, in certain embodiments, drive shaft 16 of system 10 mechanically couples the hybrid power train to a load 26. In an embodiment where system 10 powers a vehicle, load 26 may be a drive wheel or wheels that cause the vehicle to move in a forward or reverse direction. System 10 may include any type of load 26 other than a drive wheel, for example any load that includes kinetic energy that may intermittently be slowed by any braking device included in the hybrid power train. Additionally, system 10 includes conventional friction brakes 28 which operate to apply braking torque to load 26 in a manner that is known in the art.

The description herein assumes that system 10 is used in a vehicle application, and specifically, a hybrid electric drive vehicle. It should be understood, however, that the principles of the present disclosure are also applicable to all electric vehicles and other applications. As indicated above, in such applications drivability is an important consideration. Drivability can be considered in terms of the smoothness and steadiness of acceleration and deceleration as felt by the vehicle driver. Drivability may be a particular concern for vehicles having diesel engines because diesel engines are inherently slow to respond to acceleration requests. In hybrid vehicles having a diesel engine and an electric motor/generator (i.e., a device having extremely fast response characteristics), the acceleration aspect of drivability may be substantially improved by supplementing the engine acceleration with power from the electric motor. In fact, because electric motors are capable of providing nearly instant power for acceleration, it is desirable to slow or limit their transient behavior to avoid overly aggressive acceleration, which also impairs drivability.

Similarly, when an electric motor/generator is used in regenerative braking, the negative torque applied to the load may be excessive if not limited. Indeed, in some applications, an unrestricted application of negative torque by a motor/generator operating in generator mode may feel to the driver the same as slamming the friction brakes to the point of causing the wheels to lock up. Obviously, such unrestricted application of negative torque impairs drivability. Thus, the present disclosure provides systems and methods for limiting application of negative torque applied to load 26 by MG 14, particularly at low speeds. While any limit on the application of negative torque by MG 14 during regenerative braking results in a lost opportunity for generating power for storage in energy storage device 20, the present disclosure provides approaches that take into account the trade-off between power generation and drivability.

It should be noted that the sign convention employed for torque in the present disclosure is assumed directional based on the direction of rotation of the wheels. For the purposes of the present disclosure, positive torque tends to make the vehicle accelerate in the selected direction (i.e., forward drive or reverse). Conversely, negative torque tends to decelerate the vehicle toward zero speed. Thus, when reference herein is made to negative torque or braking torque, it is always intended to imply torque that opposes current motion to drive speed toward zero by absorbing the kinetic energy of the vehicle. Hence, the principles of the present disclosure are equally applicable in the forward drive and reverse directions.

In the application described herein, it is assumed that regenerative braking of the hybrid vehicle is not triggered by application of the brake pedal, an assumption that applies to many commercial vehicles, for example. In such a vehicle, a fixed amount of braking torque is applied to load 26 whenever the driver takes his or her foot off of the accelerator pedal, an event reported by torque request device 22 as a braking request value to torque module 25 of controller 24.

Figure 3:
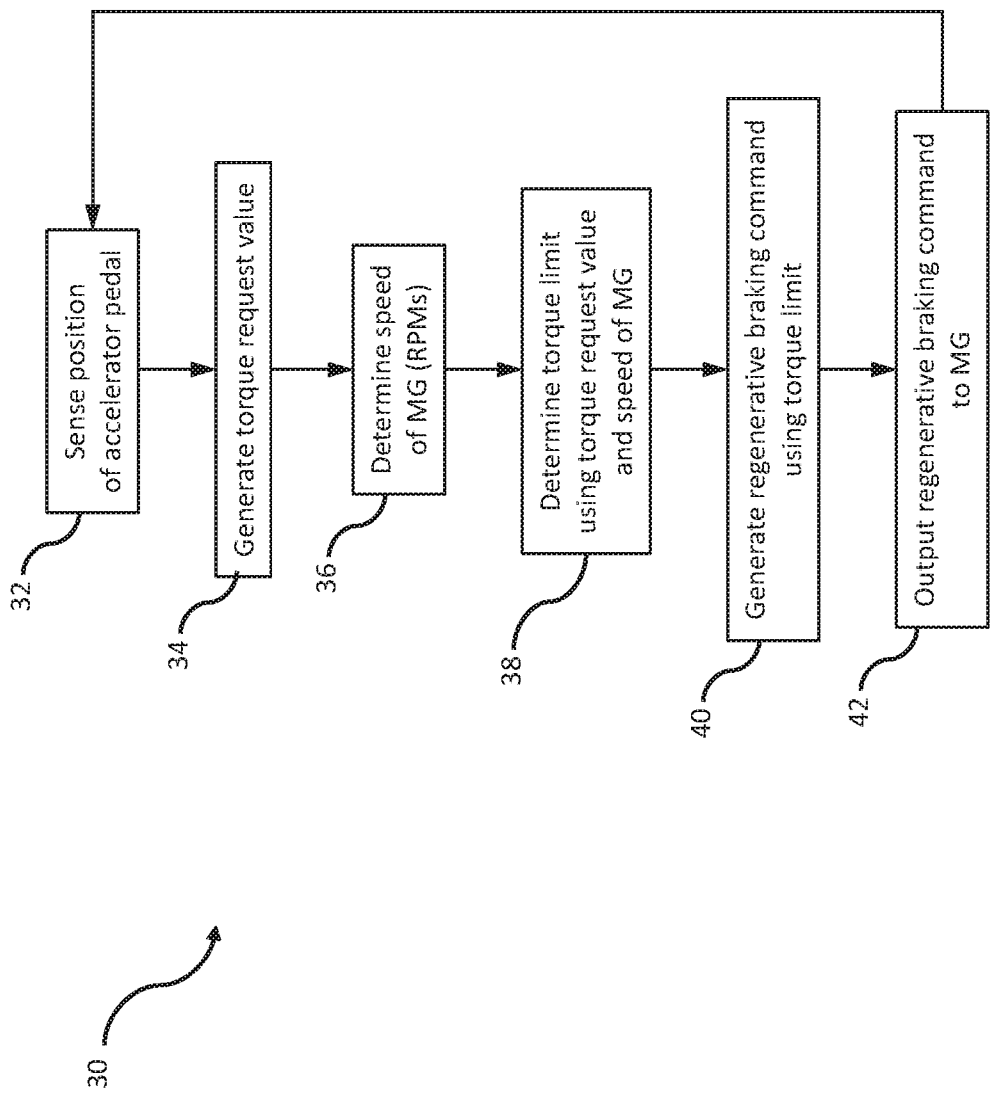
FIG. 3 is a block diagram of a method according to one embodiment of the present disclosure.

Referring now to FIG. 3, an exemplary method for regenerative brake torque scheduling is shown. Method 30 begins with sensing the position of the vehicle accelerator pedal (step 32). Specifically, torque request device 22 receives a signal from accelerator pedal sensor 23 indicating whether the vehicle accelerator pedal is in an active position (i.e., pressed down by the driver), an inactive position (i.e., released by the driver), or some position in between the active and inactive positions. Torque request device 22 then outputs a torque request value at step 34 corresponding to the sensed accelerator position. The torque request value is received by controller 24. Controller 24 also determines the speed of operation of MG 14 at step 36 by communicating with MG 14, a speed sensor 15 (see FIG. 1) in communication with MG 14, a separate motor/generator controller, or some other device that provides an indication of MG's 14 current number of rotations per minute (RPM). At step 38, torque module 25 of controller 24 uses the torque request value and the speed of MG 14 to determine a torque limit corresponding to those two parameters. Torque module 25 may make the torque limit determination using an algorithm or formula representing a desired relationship between the torque limit, the torque request value and the speed of MG 14. Alternatively, torque module 25 may access a look-up table stored in a memory device 29 of controller 24 or accessible by controller 24 to determine the appropriate torque limit. Under certain conditions, at step 40 braking control module 27 of controller 24 generates a regenerative braking command using the torque limit. Finally at step 42, controller 24 outputs the regenerative braking command to MG 14. The regenerative braking command causes MG 14 to apply negative torque to load 26 through driveshaft 16. MG 14 may operate in generator mode and convert the kinetic energy absorbed through regenerative braking into electrical energy for storage in energy storage device 20.

Figure 4:
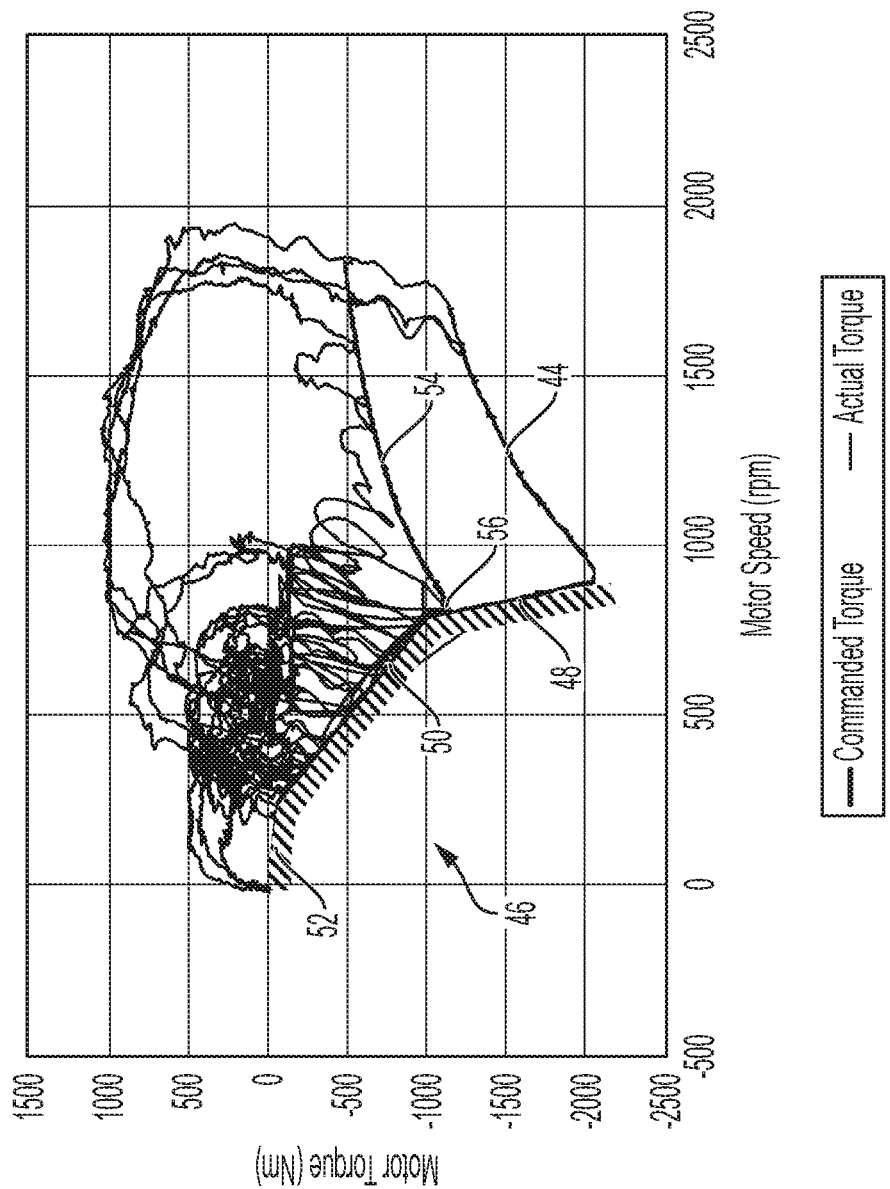
FIG. 4 is a graph of data of motor torque versus speed for an application using an energy storage device having a power limit of −100 kW.

Referring now to FIG. 4, a torque vs. speed graph 43 is provided depicting actual data from an application wherein vehicle braking and acceleration occurred over time. The commanded torque varies in response to acceleration and deceleration commands for the application across the various engine speeds shown. It can be seen from the data that using this example of negative torque scheduling, a negative peak of maximum braking torque occurs at approximately 900 RPM. At motor speeds higher than 900 RPM, the commanded torque is power limited by MG 14 (see curve 44). Below 900 RPM, the commanded torque limit 46 tapers to zero torque. More specifically, the commanded torque limit 46 tapers with one slope 48 from about −2100 Nm at about 900 RPM to about −1100 Nm at about 800 RPM. As the speed of MG 14 decreases, commanded torque limit 46 decreases in slope. Specifically, commanded torque limit 46 has a decreased slope 50 from about −1100 Nm at about 800 RPM to about −25 Nm at about 250 RPM. Commanded torque limit 46 has a further decreased slope 52 from about −25 Nm at about 250 RPM to zero Nm at zero RPM. It should be understood that if commanded torque limit 46 were not imposed at speeds below 900 RPM, a negative torque of about −2100 Nm would be applied, resulting in nearly immediate braking and very poor drivability. It should also be understood that the unrecovered power resulting from imposing commanded torque limit 46 is relatively small because the available power (i.e., speed times negative torque) is relatively low at speeds below 900 RPM because the amount of kinetic energy is relatively low.

Figure 5:
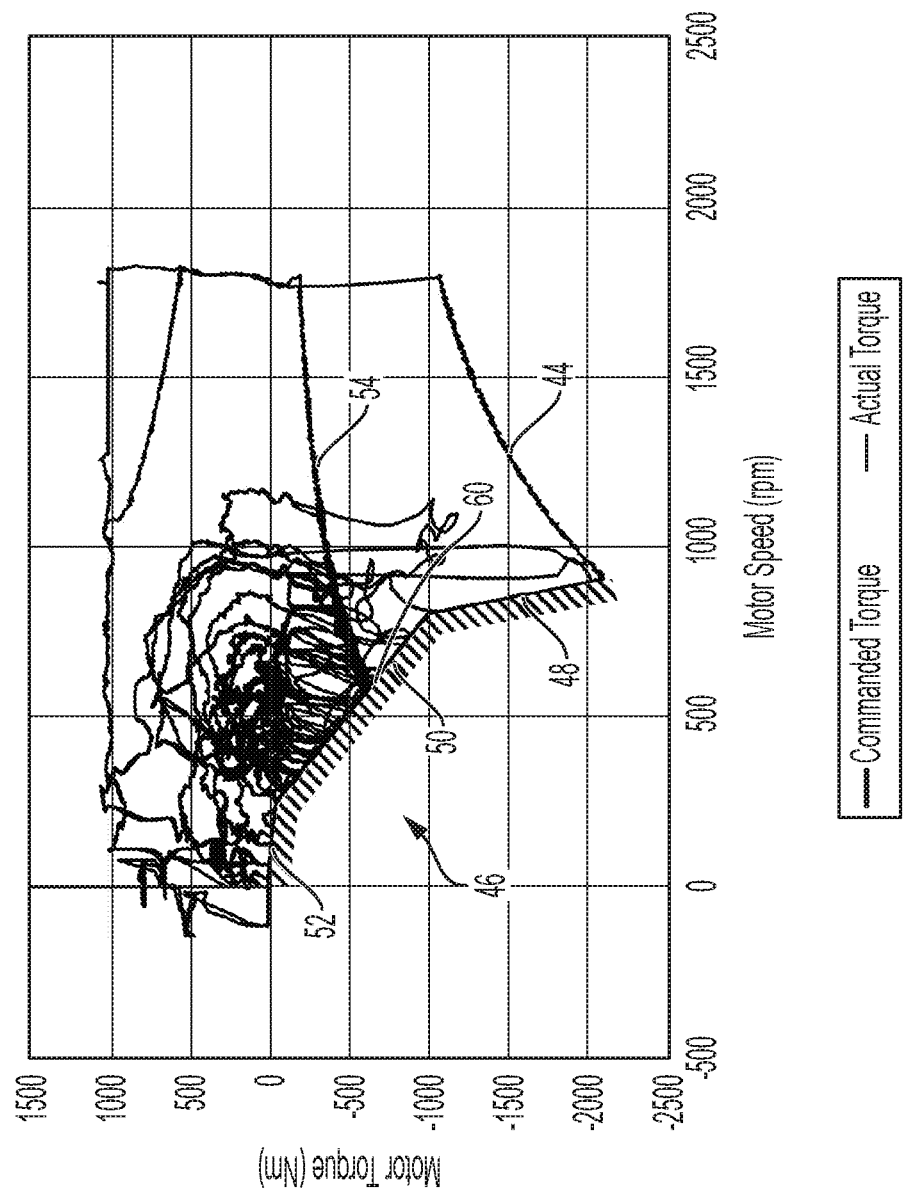
FIG. 5 is a graph of data of motor torque versus speed for an application using an energy storage device having a power limit of −40 kW.

The actual torque 54 applied to load 26 in graph 43 is a function of the power limit of energy storage device 20. In FIG. 4, a storage device with a power limit of −100 kW was used. This resulted in a peak actual torque 56 of about −1100 Nm at about 800 RPM. This amount of torque was also perceived as abrupt during the testing. FIG. 5 depicts another data set using an energy storage device 20 having a power limit of −40 kW. As shown, the peak actual torque 60 was only about −750 Nm at about 650 RPM. Even this amount of braking torque was perceived by some drivers as severe for normal city driving.

Figure 6:
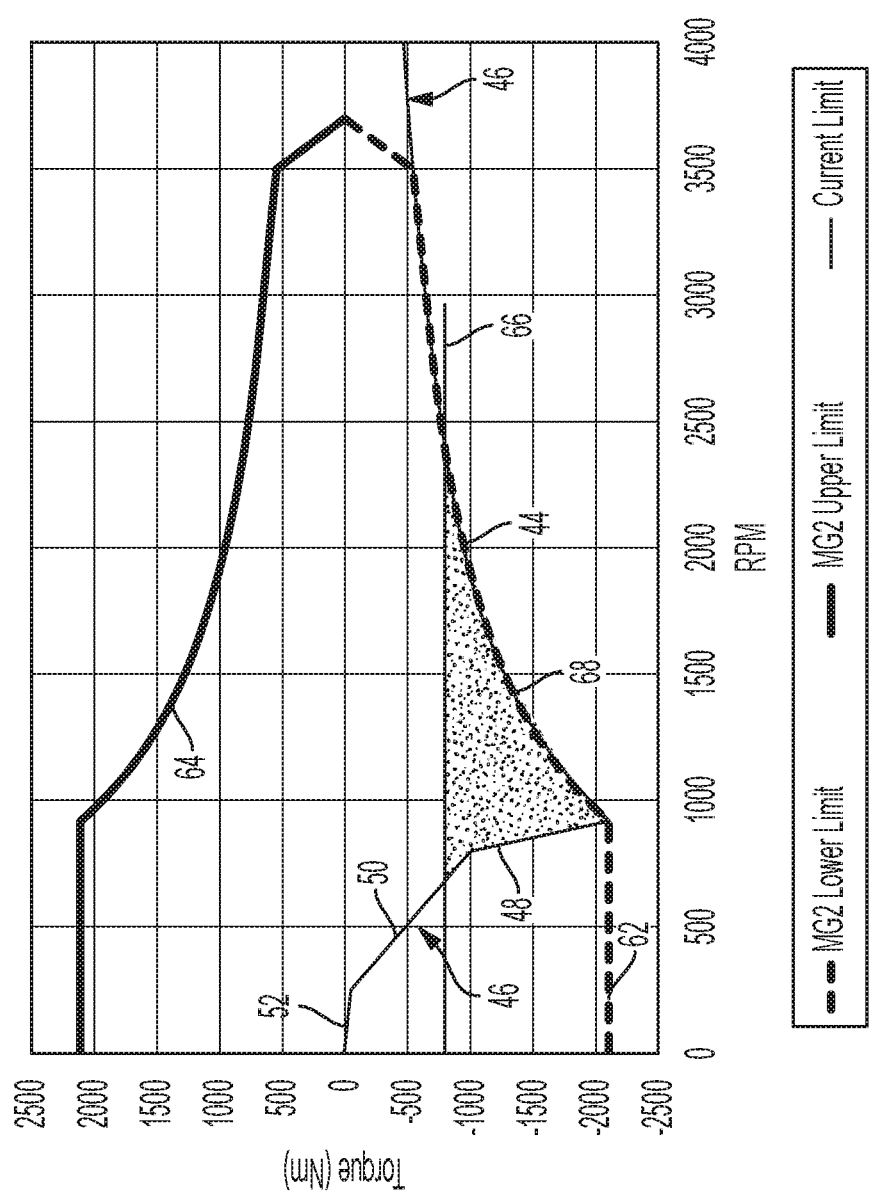
FIG. 6 is a graph depicting motor/generator torque limits according to one embodiment of the present disclosure.

FIG. 6 depicts commanded torque limit 46 as it relates to the actual torque boundary limits of an MG 14. As shown, in this example the negative torque limit 62 of MG 14 is about −2100 Nm from zero RPM to about 900 RPM. At speeds greater than 900 RPM, negative torque limit 62 follows a constant power curve 44 and gets smaller as speed increases. Negative torque limit 46 is as depicted in FIGS. 4 and 5 between zero RPM and about 900 RPM. Negative torque limit 46 follows the curve 44 as also shown in FIGS. 4 and 5. The positive torque limit 64 mirrors the negative torque limit 62. Positive torque limit 64 and negative torque limit 62 are actual boundary limits of MG 14 as provided by the manufacturer.

Through testing, it has been determined that a desirable zero-throttle torque limit should be within the range of approximately −700 Nm and −1200 Nm, and probably closer to −700 Nm. It is clear that an unconstrained torque limit of approximately −2100 Nm is unacceptable from a drivability perspective. As such, in one embodiment system 10 is designed such that the negative torque limit 66 is approximately −800 Nm to −1000 Nm and constrained to be in effect only when the brake pedal is not depressed for reasons that are described below.

Referring again to FIG. 6, line 66 depicts an example negative torque limit 62 of approximately −800 Nm for a fixed amount of regenerative braking at speeds below approximately 2500 RPM. In other words, regardless of the motor speed below 2500 RPM, when the driver releases the accelerator pedal, system 10 causes approximately −800 Nm of regenerative braking to occur. For this application, this torque amount is selected as being sufficient for most braking events in typical city driving. FIG. 6 depicts the trade-off between power generation and drivability. More specifically, the shaded region 68 represents the lost opportunity to generate torque through regenerative braking due to drivability constraints. If the driver encounters a driving condition that requires more severe braking than is provided with torque limit 66, the brake pedal can be depressed, activating the vehicle friction brakes. However, friction brakes do not capture vehicle kinetic energy as the vehicle decelerates. To attempt to capture at least a portion of this energy when the brake pedal is depressed, the negative torque limit 66 is decreased to a lower (more negative) value at a controlled rate, providing a greater regenerative braking capability by moving into the shaded region 68. When the brake pedal is again released, suggesting the driver has slowed the vehicle sufficiently, the negative torque limit 66 is again imposed and normal driving can be resumed.

Figure 7:
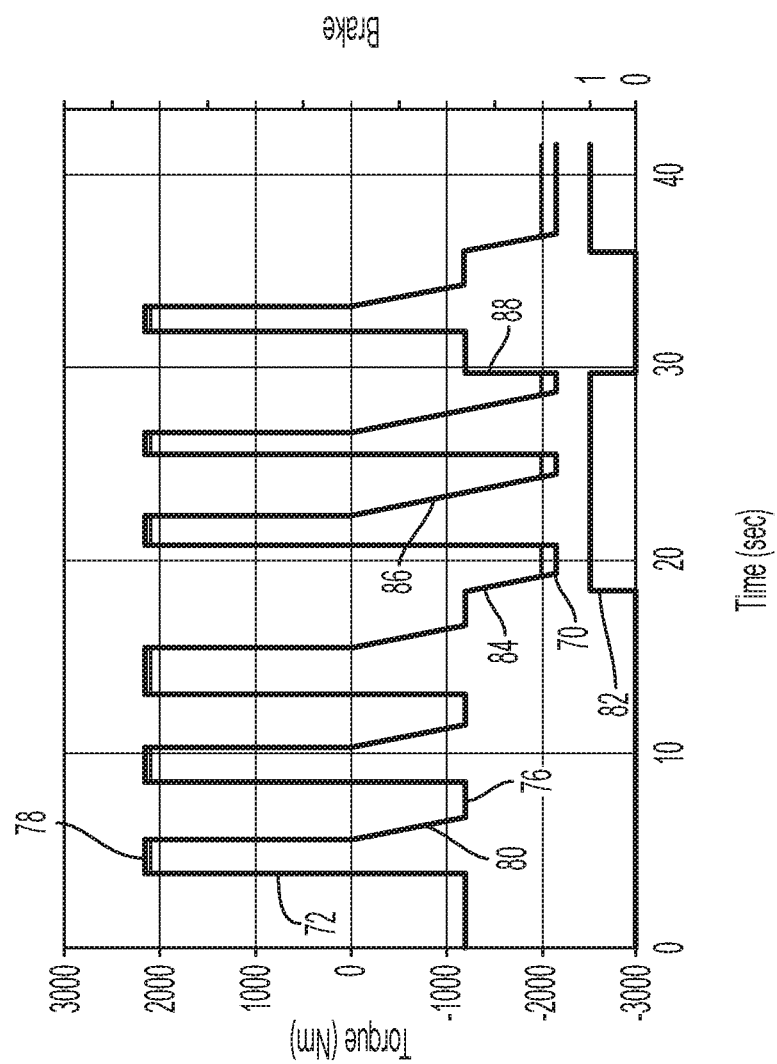
FIG. 7 is a graph depicting torque versus time showing negative torque rate limiting according to one embodiment of the present disclosure during regenerative and mechanical braking while the vehicle is in a forward gear.

Referring now to FIG. 7, a graph of torque versus time (instead of torque versus speed) is shown. Trace 70 is commanded torque and trace 72 is actual torque. The vehicle in this example is operating between a zero acceleration pedal position (resulting in a commanded torque of −2100 Nm, but limited to approximately −1200 Nm in regenerative braking torque indicated by number 76) and a 100% acceleration pedal position (resulting in maximum torque of approximately 2100 Nm as indicated by number 78). According to the principles of the present disclosure, the decrease in torque is rate limited (as a negative torque limit) as torque decreases below zero Nm. This rate limiting causes the sloped decrease 80 between zero Nm and −1200 Nm. At approximately 18 seconds, the operator activated the brake pedal (represented by trace 82), thereby generating additional negative torque beyond the negative torque limit produced by regenerative braking. This sloped decrease 84 corresponds a rate limited entry into shaded region 68 of FIG. 6. At approximately 23 seconds, the operator released the accelerator pedal while the mechanical brake was still activated. Thus, sloped decrease 86 reflects negative torque limiting from zero Nm down to the maximum negative torque of approximately −2100 Nm. FIG. 6 also shows as increase 88 that when the brake pedal is deactivated (at approximately 30 seconds) the regenerative negative torque limit of approximately −1200 Nm is again imposed without rate limiting. In certain embodiments of the present disclosure, a suitable negative torque limit for regenerative braking is between −800 Nm and −1000 Nm rather than −1200 Nm as shown in FIG. 7.

Figure 8:
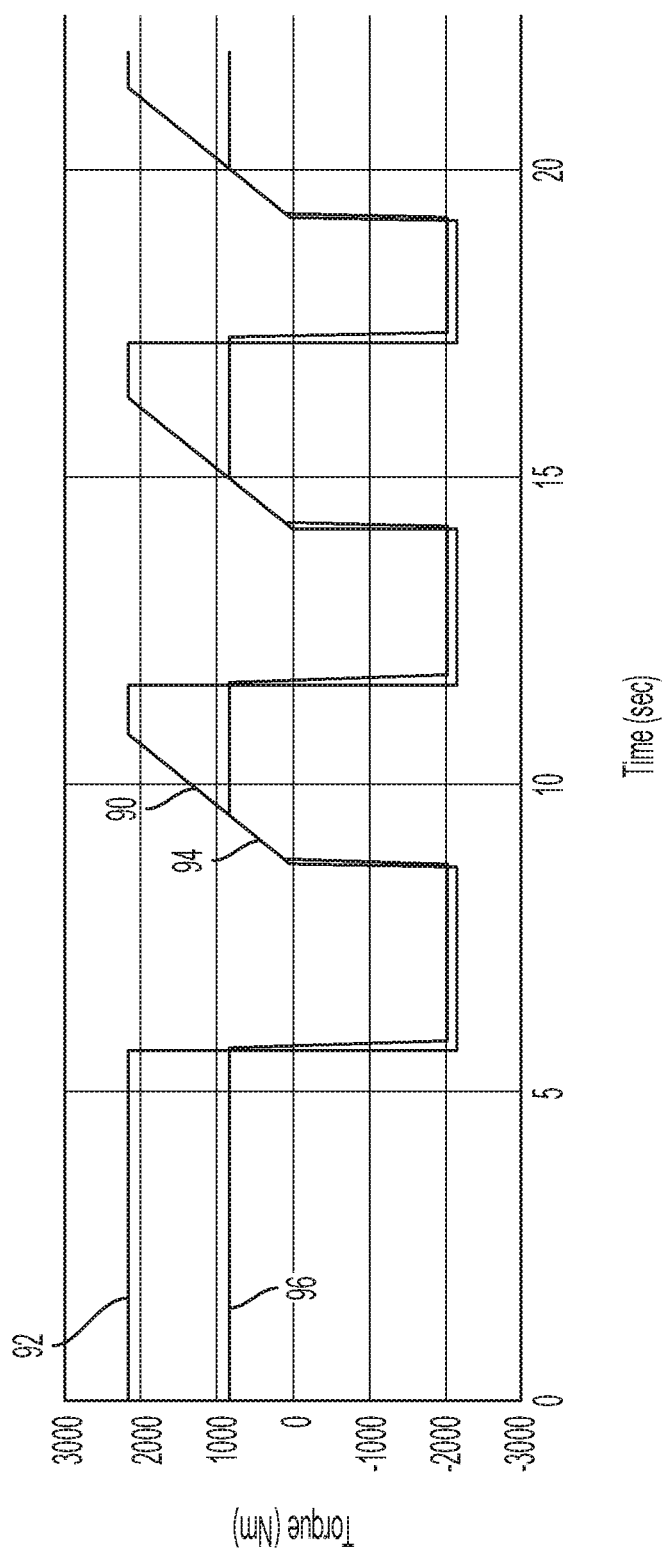
FIG. 8 is a graph depicting torque versus time showing negative torque rate limiting according to one embodiment of the present disclosure during regenerative and mechanical braking while the vehicle is in a reverse gear.

FIG. 8 depicts torque rate limiting during braking according to the principles of the present disclosure when operating the vehicle in reverse gear. When operating in reverse, all torque signs are reversed (i.e., positive torque represents regenerative braking) and as a result, the positive torque values in FIG. 8 are rate limited as depicted by the sloped portions 90 of commanded torque 92 and the sloped portions 94 of actual torque 96.

Figure 9:
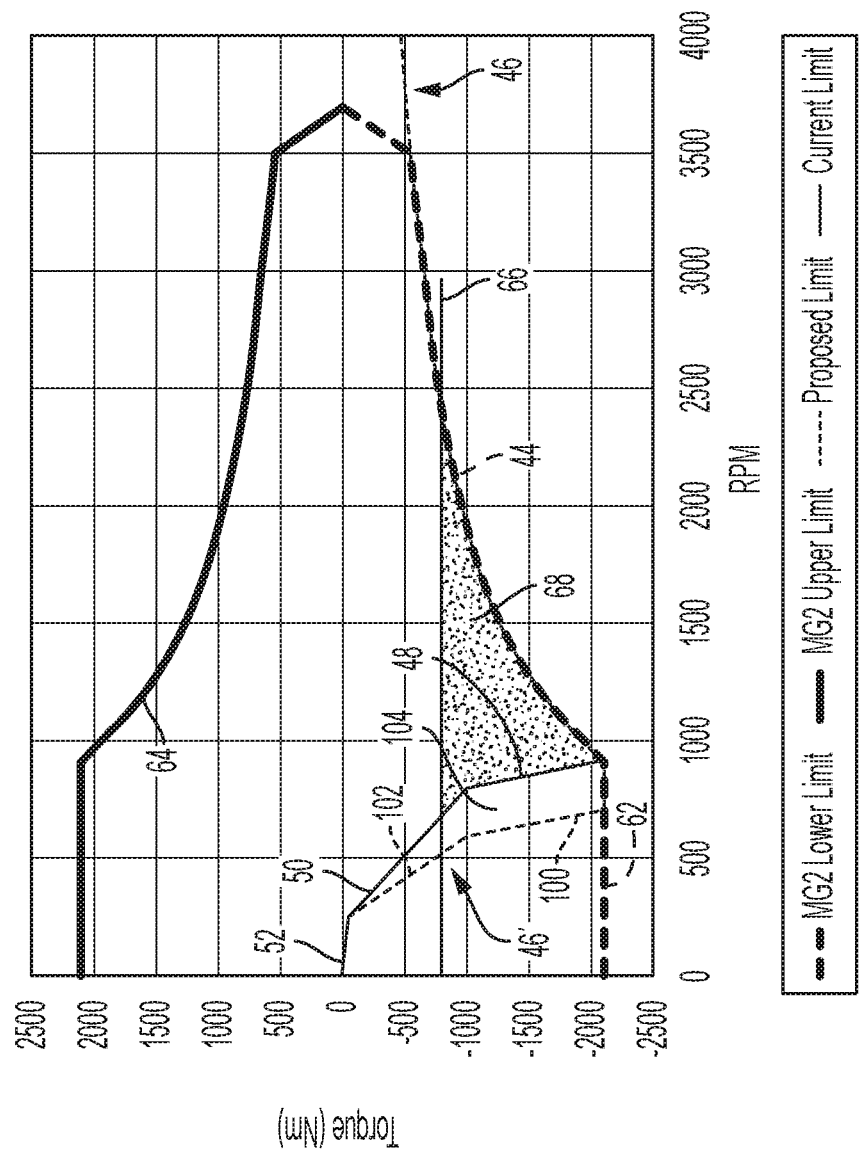
FIG. 9 is a graph similar to FIG. 6 depicting different motor/generator torque limits according to another embodiment of the present disclosure.

Finally, referring to FIG. 9, an embodiment of the present disclosure is shown wherein additional energy capture through regenerative braking is permitted at low speeds. In this example, unlike the prior examples where the commanded torque limit 46 tapered with slope 48 from about −2100 Nm at about 900 RPM to about −1100 Nm at about 800 RPM, in FIG. 9 commanded torque limit 46' tapers with slope 100 from about −2100 Nm at about 700 RPM to about −1100 Nm at about 600 RPM. Similarly, unlike slope 50 of commanded torque limit 46 which tapered from about −1100 Nm at about 800 RPM to about −25 Nm at about 250 RPM, slope 102 of commanded torque limit 46' tapers from about −1100 Nm at about 600 RPM to about −25 Nm at about 250 RPM. The slope 52 is the same for commanded torque limit 46 and commanded torque limit 46'. As should be understood from the foregoing, commanded torque limit 46' permits energy recapture in area 104 (i.e., at speeds between approximately 900 RPM and approximately 500 RPM) that was not possible using commanded torque limit 46.

While this invention has been described as having exemplary designs, the present invention can be further modified within the spirit and scope of this disclosure. This application is therefore intended to cover any variations, uses, or adaptations of the invention using its general principles.

Further, this application is intended to cover such departures from the present disclosure as come within known or customary practice in the art to which this invention pertains and which fall within the limits of the appended claims.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for scheduling regenerative braking torque, comprising:
    sensing a position of an accelerator pedal;
    generating a torque request value in response to the sensed accelerator pedal position;
    determining a speed of operation of a motor/generator;
    determining a torque limit in response to the torque request value and the determined speed of operation of the motor/generator;
    generating a regenerative braking command in response to the torque limit;
    outputting the regenerative braking command to the motor/generator; and modifying the torque limit in response to a state of a brake pedal,
    wherein the torque limit is a negative torque limit, and
    wherein the modifying comprises decreasing the negative torque limit in response to the brake pedal having a depressed state.

2. The method of claim 1, wherein the sensing the position of the accelerator pedal includes receiving a signal from an accelerator pedal sensor, the signal indicating whether the accelerator pedal is in an active position or an inactive position.

3. The method of claim 1, further comprising converting kinetic energy from regenerative braking into electrical energy and storing the electrical energy in an energy storage device.

4. The method of claim 1, wherein the determining the torque limit includes rate limiting decreases in torque below zero Nm.

5. A system for scheduling regenerative braking torque, comprising:
    a pedal sensor configured to output a position signal indicating a position of an accelerator pedal;
    a torque request device coupled to the pedal sensor and operable to generate a torque request value in response to the position signal;
    a speed sensor configured to output a speed signal indicating a speed of operation of a motor/generator; and
    a controller coupled to the speed sensor and the torque request device, the controller being configured to determine a torque limit in response to the torque request value and the speed signal, generate a regenerative braking command in response to the torque limit, and output the regenerative braking command to the motor/generator,
    wherein the system is configured to modify the torque limit in response to a state of a brake pedal, and
    wherein the system is further configured to decrease the torque limit in response to the state being a depressed state.

6. The system of claim 5, wherein the pedal sensor indicates whether the accelerator pedal is in an active position or an inactive position.

7. The system of claim 5, further comprising an energy storage device coupled to the motor/generator and configured to store electrical energy converted from kinetic energy during regenerative braking by the motor/generator.

8. The system of claim 7, wherein the energy storage device is one of a battery or an ultra-capacitor.

9. The system of claim 5, wherein the controller is further configured to determine the torque limit by rate limiting decreases in torque below zero Nm.

10. The system of claim 5, further comprising a drive shaft coupled between a load and the motor/generator and configured to transfer energy to and from the motor/generator.

11. The system of claim 10, wherein the regenerative braking command causes the motor/generator to apply a negative torque to the load through the drive shaft.

12. The system of claim 5, further comprising an internal combustion engine coupled to the motor/generator.

13. The system of claim 12, wherein the internal combustion engine is a diesel engine.

14. The system of claim 5, further comprising a memory device, the controller including a torque module configured to access a look-up table stored in the memory device to determine the torque limit.

15. The system of claim 5, wherein the controller further includes a braking control module configured to generate the regenerative braking command using the torque limit.

16. The system of claim 5, wherein the torque request value varies in an analog, proportional fashion between a maximum positive limiting value and a maximum negative limiting value as the position of the accelerator pedal varies between an active position and an inactive position.

17. A method for scheduling regenerative braking torque, comprising:
  sensing a position of an accelerator pedal;
  generating a torque request value in response to the sensed accelerator pedal position;
  determining a speed of operation of a motor/generator;
  determining a torque limit in response to the torque request value and the determined speed of operation of the motor/generator;
  generating a regenerative braking command in response to the torque limit;
  outputting the regenerative braking command to the motor/generator; and
modifying the torque limit in response to a state of a brake pedal,
  wherein the torque limit is a negative torque limit, and wherein the modifying comprises increasing the negative torque limit in response to the brake pedal having a released state.

* * * * *